United States Patent [19]

Leventer

[11] 4,186,393

[45] Jan. 29, 1980

[54] DIGITAL CHARACTER FONT ENHANCEMENT DEVICE

[76] Inventor: William Leventer, 18 Bruce La., East Northport, N.Y. 11731

[21] Appl. No.: 881,852

[22] Filed: Feb. 27, 1978

Related U.S. Application Data

[63] Continuation of Ser. No. 757,069, Jan. 5, 1977, abandoned.

[51] Int. Cl.[2] .................... G06F 3/14

[52] U.S. Cl. .................... 340/729; 340/748; 340/800; 340/801; 340/814

[58] Field of Search .......... 340/324 AD, 324 A, 744, 340/748, 749, 750, 798, 800, 801, 814, 729

[56] References Cited

U.S. PATENT DOCUMENTS

| | | | |
|---|---|---|---|
| 3,441,789 | 4/1969 | Harrison | 340/324 AD |
| 3,781,849 | 12/1973 | Baron et al. | 340/324 AD |
| 3,918,039 | 11/1975 | Clark | 340/324 AD |

*Primary Examiner*—Marshall M. Curtis
*Attorney, Agent, or Firm*—Toren, McGeady and Stanger

[57] ABSTRACT

A device for providing various kinds of video edge information for character video is disclosed. The all-digital device employs a plurality of scan-line length shift registers which function as delay means. The shift registers are series-connected and receive the digital video information. The outputs of the shift registers and the "present" video information are supplied to short-duration delay devices, e.g. 4 bit shift registers. By appropriately combining the outputs of the short-duration delay devices, a character video and an edge signal are produced. Digital inputs and appropriate gating means can produce a variety of enhanced character fonts.

3 Claims, 7 Drawing Figures

DIGITAL CHARACTER FONT ENHANCEMENT DEVICE

This is a continuation of application Ser. No. 757,069, filed Jan. 5, 1977, now abandoned.

FIELD OF THE INVENTION

The present invention relates to a device for providing video edge information for character video and, in particular, an all-digital device for providing all-around edge information for character video, or other discrete video information. The edge information may be keyed into standard analog or digital video signals.

BACKGROUND OF THE PRESENT INVENTION

Prior art systems for video enhancement of the edges of characters are generally of an analog nature. These analog devices usually have critically designed delay lines and other analog components. Further, such systems, while capable of providing video edge information, to a certain extent have the inherent limitation that they can not provide such information all around the character.

One approach for providing a digital all-around edge device is described in U.S. Pat. No. 3,918,039 to Clark. This device, however, is complicated in its use of 4 different clock phases and various shaping and phasing devices.

SUMMARY OF THE PRESENT INVENTION

An object of the present invention, therefore, is the provision of a simplified, all-digital, video character enhancement system.

An additional object of the present invention is the provision of such a video character enhancement system which provides a variety of all-around edge information.

A further object of the present invention is the provision of a video character font enhancement device which is more flexible and less expensive to manufacture.

A still further object of the present invention is the provision of a character font enhancement device which provides a character font having different width characters, different width edging and various combinations of black and white characters and edging.

In accordance with the present invention, a digital video display enhancement device having a synchronized digital video signal supplied thereto comprises means for supplying a synchronized clock pulse signal and means responsive to the clock pulse signal for determining a certain number of intervals on a scan line. Also included are X digital delay means responsive to the output of the interval determining means and the digital video signal for providing X output signals, each signal representative of the digital video signal delay by X,X−1,. . . 1 scan lines. A number X+1 short-duration digital delay means are included which are responsive to each of the scan-line delayed signals and an undelayed incoming digital video signal for providing X+1 sets of intermediate output signals. Finally included are combining means responsive to the intermediate output signals for providing keying signals for an enhanced video display.

For a better understanding of the present invention, reference is made to the following description and accompanying drawings and the scope of the invention is pointed out in the appended claims.

DESCRIPTION OF THE INVENTION

Figure 1:
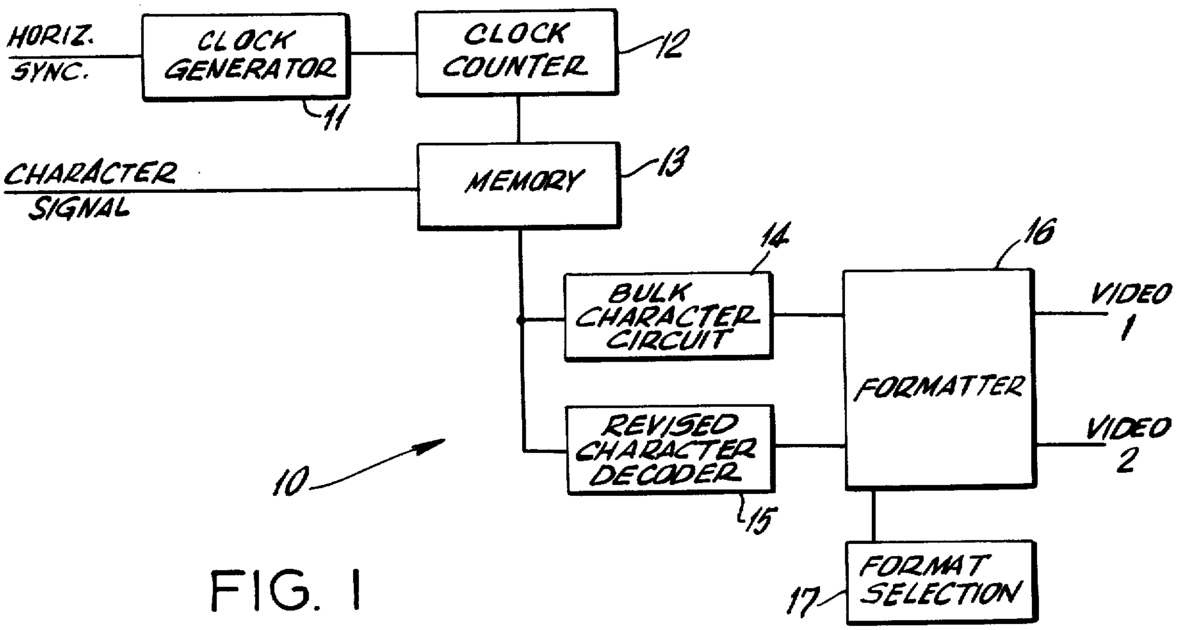
FIG. 1 is a basic block diagram of the character enhancement device of the present invention.

Referring initially to FIG. 1, the input character video signal and the horizontal sync signal are supplied to the system 10. It should be noted that in a television system, all signals are synchronized to provide a jitter-free, stable picture. Accordingly, the horizontal sync information is used to synchronize a clock generator 11 so that the clock edges from scan line to scan line coincide in time with respect to the edge of the horizontal sync which causes the receiving device to resynchronize a line.

Pulses from the clock generator 11 are supplied to a clock counter 12. The clock counter counts the pulses to provide a number of pulses to a memory or delay device 13, such as a shift register, which are equal to the length of the basic shift register. Various bit positions of the memory 13 are then decoded by the bulk character circuit 14 and the revised character decoder 15. These signals represent the edge information and the character information which are then applied to the formatter 16.

The formatter 16 further synthesizes the video into proper signals for presentation as keying signals, Video 1 and Video 2, to a keyer (not shown). The keyer inserts the Video 1 and Video 2 signals into the final video output signal. The format selector 17 determines the desired format of the character enhancement by means of switches, computer program, or other control means.

Referring now to the schematic representation of FIG. 2, a more detailed representation of the present invention will be described. Clock generator 11 corresponds to circuit UA, typically a National Semiconductor 74121, monostable multivibrator which as shown is connected as an oscillator and is synchronized to the sync signal at the beginning of each scan line. A typical clock frequency is 5.95 MHZ. All part numbers refer to National Semiconductor publication "Digital Integrated Circuits", dated January 1974, unless otherwise indicated.

The output of UA is connected to the clock counter 12 which comprises circuits UB, UC, UD and U9*b*. Clock counter 12 determines a certain number of intervals on a scan line. Circuits UB and UC are each 4 bit counters such as National Semiconductor 7493. Circuits UD and U9*b* are flip-flops such as a National Semiconductor 7473 Dual JK Master/Slave Flip Flop.

Figure 4:
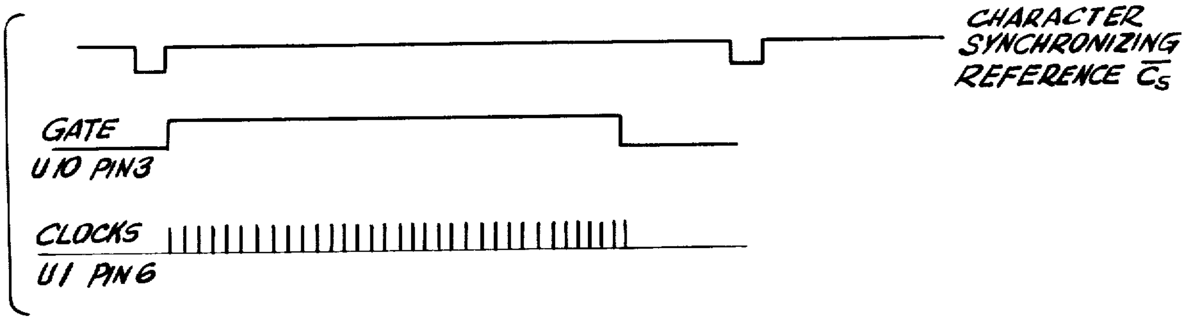
FIG. 4 is a timing diagram showing key waveforms of FIG. 2.

Circuit UB receives the pulse train from UA and counts 16 pulses so as to provide an output signal (UB, pin 11). The UB output signal is supplied to circuit UC which counts an additional 16 pulses before an output is developed (at pin 1 of UC). These outputs of UB and UC are then applied as timing signals to the flip flops UD and U9*b*. The outputs of these flip-flops are supplied to a NAND gate U10*b* which together with the inverter U10*a* following form a gate signal output. The output of the inverter is a gating signal which lasts for exactly 256 input clock pulses. Reference is made to FIG. 4, a timing diagram, which shows this signal as being produced at Gate U10*a*, pin 3. A character synchronizing signal, Reference $\overline{C}_s$, is also shown on FIG. 4.

Figure 2:
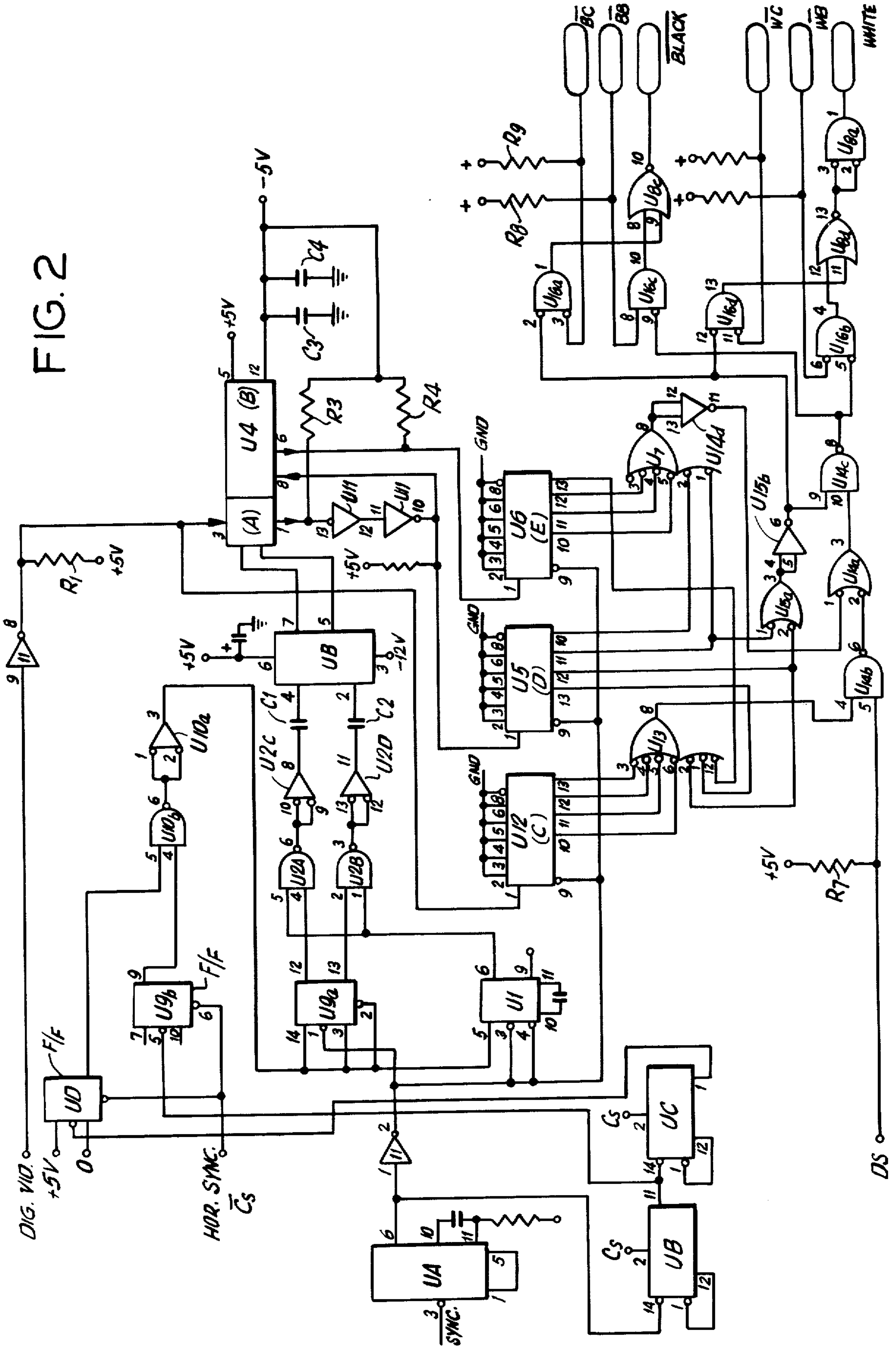
FIG. 2 is a detailed schematic diagram of the device of the present invention.

The embodiment described in FIG. 2 provides for a display of 16 characters in each scan line. Each character is made up of 10 elements with 6 elements allowed for inter-character spacing. It is seen that 16 characters X (10+6)=256 is the number of clock pulses required to shift the video information for one scan line.

The memory or delay circuit 13 is composed of circuit U4 having parts A and B, U12 (C), U5 (D) and U6 (E) and primarily comprise a shift register arrangement. Circuit U4, parts A and B are two 256 bit shift registers as, for example, portions of a type 1402 QUAD 256 BIT Shift Register, manufactured by Advanced Micro Devices. Four such shift registers are available in this unit. This type 1402 unit requires that a two-phase clock be provided to shift data into the register. The part A and B 256 BIT Registers represent digital delay means which are responsive to the clock counter B and the incoming digital video signal for providing output signals representative of the digital video, delayed by either one or two scan lines. Circuits U1, gates $U_{2A}$ and $U_{2B}$ and Flip-Flop $U_{9a}$ form the necessary two phase clock. The pulses from the clock counter 12 are supplied thereto. The outputs of gates $U_{2A}$ and $U_{2B}$ are supplied by way of inverters to clock driver U3. The outputs of clock driver U3 are supplied to the shift register arrangement. U12(C), U5(D) and U6(E) represent short-duration digital delay means. U12 (C), U5 (D) and U6 (E) are preferably National Semiconductor types 7495, 4 Bit Right-Shift/Left-Shift Registers.

Figure 3:
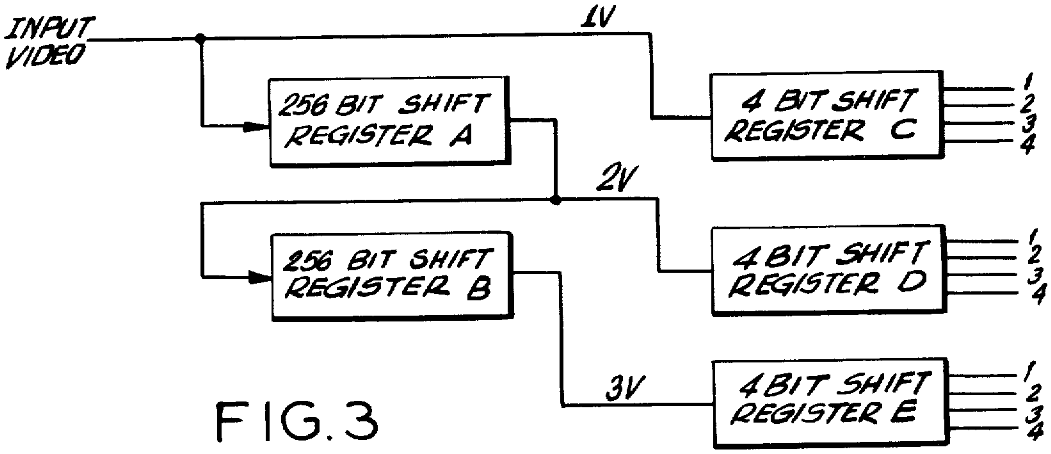
FIG. 3 illustrates a block diagram of the memory or delay means of the present invention showing the sequence of video information being generated.

The function of the shift registers may be more readily explained by reference to FIG. 3. The incoming video (DIG VID input in FIG. 2) is applied in digital form to the input of shift registers C and A. Since there are 256 clock pulses per scan line, the output of shift register A will be identical to its input but one scan line (256 clock pulses) later. This output is then applied to shift register B. The output of shift register B will be identical to the input of shift register A, but two scan lines (512 clock pulses) later. Thus, by observing the incoming video information, the output of register A and the output of register B, there is available at any instant of time the video information for the prior two scan lines and the current scan line. These three signals are designated as 1 V, 2 V and 3 V.

Singals 1 V, 2 V and 3 V are each applied to four-bit shift registers (C, D and E) which are also controlled by the same clock as registers A and B. Thus, the four available bit positions of the shift registers C, D and E are each representative of three successive scan lines of video information, but of four-bit positions on each line.

The four output signals of each of the registers C, D and E, 12 signals in all, are then supplied to the Bulk Character Circuit 14, composed of NOR Gates U13 and U7, the Revised Character Decoder circuit 15 shown as gate and inverter U15 and U15A, and Formatter Circuit 16 composed of NAND gates U16, U8 and U14. The various gates create, under control of a format selector, here shown as inputs $\overline{BC}$,$\overline{BB}$,$\overline{WC}$,$\overline{WB}$ and DS (to be defined later) the resulting white keying signal (WHITE) and black keying signal (BLACK). These keying signals may be used for various combinations of display discussed later. It should be understood that the use of particular inverted and non-inverted signals relate to the specific embodiment shown and are not intended to limit the general nature of these signals.

The NOR gates discussed above are preferably National Semiconductor 7402 (Quad 2 input NOR gates). The NAND gates U13 and U7 are preferably National Semiconductor 7430, 8 input gates.

Figure 5:
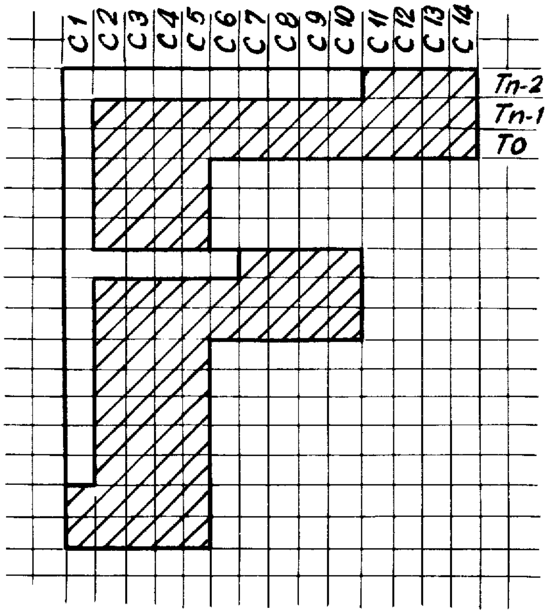
FIG. 5 illustrates the given character video with additional available information.

To evaluate how the gate structure is used, reference is made to FIG. 5. Here, it is seen how the character F would look when generated by a raster scan system using a 10×14 element character font. The line represented by $T_o$ depicts the output of all positions of register E for 14 discrete time intervals ($C_1$–$C_{14}$). The line represented by $T_{n-1}$ depicts the output of all positions of register D for 14 discrete time intervals. The line represented by $T_{n-2}$ depicts the output of all positions of register C for 14 discrete time intervals. In the figure, the unshaded area represents the video input and the shaded area represents additional information available from shift registers C, D and E.

Figure 6:
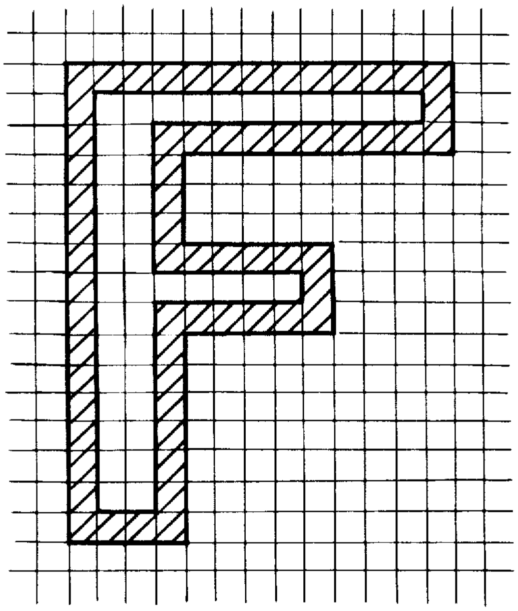
FIG. 6 shows the desired output for an all-around edged mode of character enhancement.

The representation of FIG. 6 shows a desired result for an all-around edged character. By comparing the desired signal with the available information, it will be seen that if one logically "OR"s together all of the outputs of the registers C, D, E, one would obtain a video signal representing both the unshaded and shaded portions of the graphically depicted character of FIG. 6.

The center character information is available from the second and third shifted time positions of the second register, D. Note that in this embodiment of the invention, the single element wide input portion of the character (in the horizontal direction) has been stretched so as to become two elements wide. This feature provides, in this embodiment, a more legible and bold display. Had this stretching feature not been desired, only three additional shift bits would be required at registers C, D, E. Note also that there is one shift bit of information provided for the edge information in this embodiment. In order to provide two bits of edge information, each of registers C, D, E would have to be 6 bits wide.

To generalize, with a single bit resolution input character, the number of bits required for registers C, D, E is twice the number of edge bits desired plus the number of center bits required. The center information is always available from the bit positions counted from the start of the register and including the total number of center bits required, e.g. for a double element character with double edge bits it would be required that the center information be derived from the third and fourth bit positions of the 6 bit register discussed above.

The same can be said for the information in the vertical direction. In this embodiment, it was desired to provide one scan line of edge information around the character body, as shown in FIG. 6. If it had been desired to provide two scan lines of edge information, then two additional scan lines would have to be stored in additional shift registers. The center line of the registers would always be used for center information. The digital video input (the "present" input) is included in enumerating registers.

After the total body information has been derived from the character and the center character information, the center information is used to "punch a hole" into the body information to derive an edge information only signal. Referring to FIG. 2, it is seen that NOR gates U13 and U7 are used to logically "OR" together all 12 outputs of the shift registers in this embodiment. NOR gate U15*a* is used to derive the center information.

Figure 7:
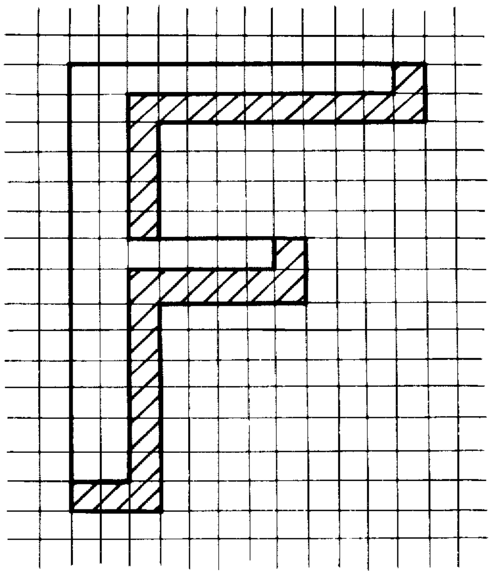
FIG. 7 shows a drop shadow mode of character enhancement.

A further feature of this all-digital method of deriving character font enhancement in this embodiment is the ability to digitally provide a drop shadow effect as shown on FIG. 7. The drop shadow information is available by ORing the outputs of register E, with the exception of the first output, together with the last output of register D, and then punching the hole as discussed above.

In the embodiment of FIG. 2, the digital video output signals logically created are (a) the center information signal at U15*b*, pin 6, and (b) the edge signal at U14*c*, pin 8.

As discussed above, the output of NOR U7 is the drop shadow information and the output of U13 is the information required to be added to the drop shadow information to create the all-around edge. The output of U13 is thus NANDED with a switchable signal at U14, pin 5, which will cause the signal at U14, pin 6, to be representative of the added information, when U14, pin 5, is at logical one, or representative of no information when U14, pin 5, is at logical 0. Thus, the information at U14, pin 3, is either the entire character body information, when U14, pin 5, is "1" or the character body information with that portion not required for drop shadow deleted, when U14, pin 5, is "0".

The signal at U14, pin 3, is then applied to NAND U14 at pin 10. The other input to U14 at pin 9 is the center signal which is used to punch the hole in the body signal. Thus, the signal at U-14, pin 8, the edge signal, is representative of the shaded portion of either FIG. 6 or FIG. 7, as desired. The signal at U15*a*, pin 3 is representative of the unshaded portion of either FIG. 6 or FIG. 7, as desired.

In this embodiment of the invention, the gate structures provided by U16 and U8 allow the selection of the signals created at U15, pin 3 and U14, pin 8 to provide the following video representations of the character as a function of format selection signals for this embodiment;

| | WC | WB | BC | BB | DS |
|---|---|---|---|---|---|
| a) white character only | 0 | 1 | 1 | 1 | 1 |
| b) black character only | 1 | 1 | 0 | 1 | 1 |
| c) white edge only | 1 | 0 | 1 | 1 | 1 |
| d) black edge only | 1 | 1 | 1 | 0 | 1 |
| e) white character with black edge | 0 | 1 | 1 | 0 | 1 |
| f) black character with white edge | 1 | 0 | 0 | 1 | 1 |
| g) white character with black drop shadow | 0 | 1 | 1 | 0 | 0 |
| h) black character with white drop shadow | 1 | 0 | 0 | 1 | 0 |

0 refers to standard logic "zero" level for devices used in this embodiment;
1 refers to standard logic "one" level for devices used in this embodiment.

The invention disclosed possesses significant advantages over currently used methods in creating edging signals. The all digital approach eliminates the need for critically designed delay lines and other analog type components. A substantial reduction in cost is possible in such systems by using digital video technology. A virtually unlimited variety of digitally synthesized alterations of the character display are provided by simply adding appropriate shift registers and combinations of gates to extract the desired digital video waveforms.

It should also be understood that in lieu of the shift register delay means described above, a random access memory with an appropriate counter can also be employed.

While the foregoing description and drawings represent the preferred embodiments of the present invention, it will be obvious to those skilled in the art that various changes and modifications may be made therein without departing from the true spirit and scope of the present invention.

What is claimed is:

1. A digital video display enhancement device having a synchronized video signal supplied thereto comprising:

means for supplying a synchronized clock pulse signal;

interval determining means responsive to the clock pulse signal for determining a certain number of intervals on a scan line;

two scan line shift registers, each having a number of bits equal to the number of intervals on a scan line determined by said interval determining means and responsive to the output of the interval determining means and the digital video signal for providing a first output signal of the digital video signal delayed by one scan line and a second output signal delayed by two scan lines;

three small-capacity shift registers, each having a capacity which is substantially less than said scan line shift registers and being responsive to each of the scan line delayed signals and an undelayed incoming video signal for providing three sets of intermediate output signals; and first gating means responsive to the outputs of said small-capacity shift registers for providing a signal representative of the video information for the display of the top edge, left edge and a central portion of a desired character;

second gating means responsive to the outputs of said small-capacity shift registers for providing a signal representative of the video information for the display of the right edge, bottom edge and another central portion of said desired character;

third gating means responsive to the output of said small-capacity shift registers for providing a signal representative of the video information for the display of the entire central portion of said character;

fourth gating means responsive to the output of the first gating means for blocking or passing said signal from said first gating means;

fifth gating means responsive to the outputs of the fourth gating means and said second gating means for providing a signal representative of the bulk of the entire character to be displayed; and sixth gating means responsive to the outputs of the third and fifth gating means for providing a signal representative of video information for the display of said character.

2. The digital video display enhancement device of claim 1, wherein said first, second, third and fifth gating means are NOR gates and wherein said fourth and sixth gating means are AND gates.

3. The digital video display enhancement device of claim 2, wherein said small-capacity shift registers are 4-bit registers, the outputs of the 4-bit register receiving the undelayed incoming video signal being supplied to said first gating means; the third and fourth outputs of the 4-bit register receiving the 1 scan line delayed signal being supplied to said first gating means; the fourth output of the 4-bit register receiving the 2 scan line delayed signal being supplied to said first gating means; the first, second and third outputs of the 4-bit register receiving the 2 scan line delayed signal and the first and second outputs of the 4-bit register receiving the 1 scan line delayed signal being supplied to said second gating means; and the second and third outputs of the 4-bit register receiving the 1 scan line delayed signal also being supplied to said third gating means.

* * * * *